US011609008B2

(12) United States Patent
Lin et al.

(10) Patent No.: US 11,609,008 B2
(45) Date of Patent: Mar. 21, 2023

(54) DETECTION AND AUTOMATIC RESPONSE TO BIOLOGICAL HAZARDS IN CRITICAL INFRASTRUCTURE

(71) Applicant: Hamilton Sundstrand Corporation, Charlotte, NC (US)

(72) Inventors: Fu Lin, Glastonbury, CT (US); Massimiliano L. Chiodo, Piedmont, CA (US); Hala Mostafa, Marlborough, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 175 days.

(21) Appl. No.: 16/913,517

(22) Filed: Jun. 26, 2020

(65) Prior Publication Data
US 2021/0404683 A1    Dec. 30, 2021

(51) Int. Cl.
*F24F 11/32*  (2018.01)
*F24F 11/63*  (2018.01)
*G05B 15/02*  (2006.01)
*F24F 11/49*  (2018.01)

(52) U.S. Cl.
CPC .............. *F24F 11/32* (2018.01); *F24F 11/49* (2018.01); *F24F 11/63* (2018.01); *G05B 15/02* (2013.01)

(58) Field of Classification Search
CPC ...... G08B 19/00; G08B 21/12; G08B 25/016; G05B 15/02; G05B 2219/2642; G05B 19/0428; G05B 2219/25011; G05B 2219/2614; F24F 11/30; F24F 11/63; F24F 2110/50; F24F 11/32; F24F 11/33; F24F 2120/10; F24F 2110/64; F24F 8/22; F24F 2110/65; F24F 2120/12; F24F 2120/14; F24F 11/00; F24F 11/64; F24F 11/65; F24F 11/72; F24F 11/80; F24F 8/20

See application file for complete search history.

(56) References Cited

U.S. PATENT DOCUMENTS

| 5,809,368 | A  | * | 9/1998  | Menjo ............... G03G 15/2003 399/68 |
| 6,217,441 | B1 |   | 4/2001  | Pearman et al. |
| 6,490,530 | B1 |   | 12/2002 | Wyatt |
| 6,583,726 | B1 |   | 6/2003  | Johnson et al. |
| 6,777,228 | B2 |   | 8/2004  | Lejeune |

(Continued)

OTHER PUBLICATIONS

European Search Report for European Application No. 21169218.1, dated Oct. 15, 2021, 8 pages.

*Primary Examiner* — Darrin D Dunn
(74) *Attorney, Agent, or Firm* — Cantor Colburn LLP

(57) ABSTRACT

Building response systems and methods of building responses are described. The building response systems include a building monitoring system configured to detect the presence of a harmful agent within an enclosed space, a building management system configured to monitor a building status and control building systems, a middleware system configured to receive information from each of the building monitoring system and the building management system, wherein the information from the building monitoring system comprises an alarm status and the information from the building management system comprises building status information, and a decision engine configured to receive information from the middleware system and to determine a mitigation action in response to receiving a positive alarm status.

16 Claims, 4 Drawing Sheets

(56) References Cited

U.S. PATENT DOCUMENTS

| | | | |
|---|---|---|---|
| 7,058,712 B1 * | 6/2006 | Vasko | H04L 41/12 700/20 |
| 7,096,125 B2 | 8/2006 | Padmanabhan et al. | |
| 7,502,115 B2 | 3/2009 | Patel et al. | |
| 7,532,320 B2 | 5/2009 | Neiss et al. | |
| 7,837,937 B2 | 11/2010 | Donaldson et al. | |
| RE42,192 E | 3/2011 | Schabron et al. | |
| 7,901,618 B2 | 3/2011 | McVey et al. | |
| 3,024,135 A1 | 9/2011 | Lee et al. | |
| 9,182,751 B1 | 11/2015 | Reeder | |
| 9,183,736 B2 | 11/2015 | Sloo et al. | |
| 9,729,945 B2 | 8/2017 | Schultz et al. | |
| 10,253,995 B1 | 4/2019 | Grant | |
| 10,613,213 B2 | 4/2020 | Silverstein et al. | |
| 2002/0084900 A1 * | 7/2002 | Peterson | G08B 7/06 340/573.1 |
| 2002/0098794 A1 | 7/2002 | Krafthefer | |
| 2005/0070025 A1 | 3/2005 | Mooradian et al. | |
| 2009/0168051 A1 | 7/2009 | McCawley et al. | |
| 2010/0035536 A1 * | 2/2010 | Brooks | F24F 7/06 454/333 |
| 2011/0063116 A1 | 3/2011 | Lepley et al. | |
| 2011/0077751 A1 * | 3/2011 | Redi | H04L 12/2816 700/19 |
| 2012/0122075 A1 | 5/2012 | Call et al. | |
| 2013/0309154 A1 * | 11/2013 | Call | G08B 21/12 423/210 |
| 2015/0077737 A1 | 3/2015 | Belinsky et al. | |
| 2016/0061476 A1 | 3/2016 | Schultz et al. | |
| 2017/0103633 A1 * | 4/2017 | Khire | A62C 37/40 |
| 2018/0364654 A1 * | 12/2018 | Locke | F24F 11/63 |
| 2019/0361411 A1 | 11/2019 | Park et al. | |
| 2021/0191349 A1 * | 6/2021 | Nemeth | G08B 25/08 |
| 2021/0222231 A1 * | 7/2021 | Dillon | C12Q 1/689 |
| 2021/0287521 A1 * | 9/2021 | Stone | G05B 13/0265 |
| 2021/0356153 A1 * | 11/2021 | Nesler | F24F 11/0001 |

* cited by examiner

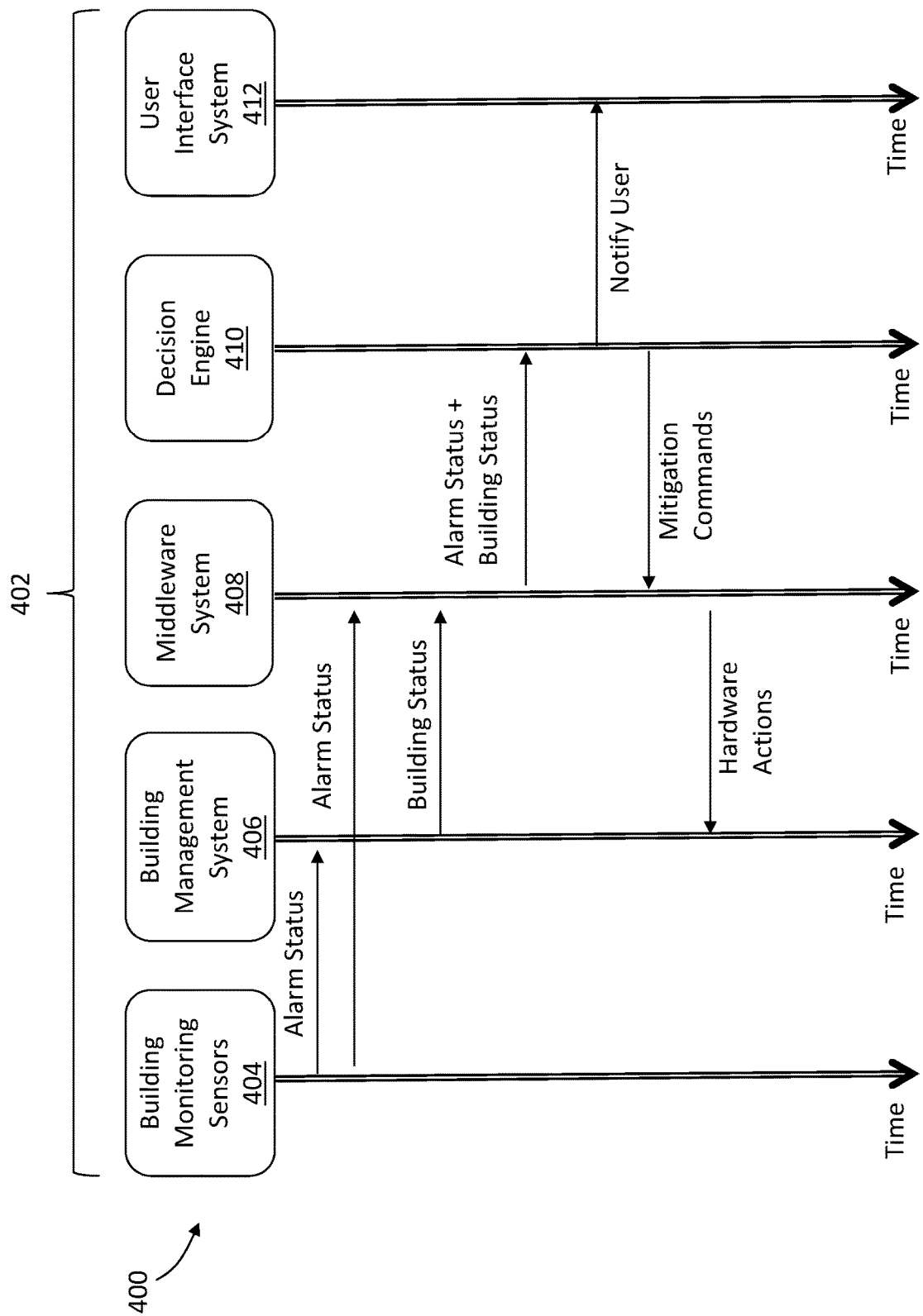

DETECTION AND AUTOMATIC RESPONSE TO BIOLOGICAL HAZARDS IN CRITICAL INFRASTRUCTURE

STATEMENT REGARDING FEDERALLY SPONSORED RESEARCH OR DEVELOPMENT

This invention was made with government support under Contract No. 70RSAT18C00000047 awarded by the Department of Homeland Security. The government has certain rights in the invention.

BACKGROUND

The subject matter disclosed herein generally relates detection and automatic response to biological hazards in critical infrastructure.

Nearly all critical infrastructure (e.g., public transportation, airports, public buildings, etc.) lack automated systems for the detection, notification, and response to a release of hazardous biological agents. It is generally assumed that the cost and operational requirements of such a system are excessive, despite the serious consequences of a release of a biological agent. It would be advantageous to have such systems for use in various infrastructure locations to enable a response to such potential release.

BRIEF SUMMARY

According to some embodiments, building response systems are provided. The building response systems include a building monitoring system configured to detect the presence of a harmful agent within an enclosed space, a building management system configured to monitor a building status and control building systems, a middleware system configured to receive information from each of the building monitoring system and the building management system, wherein the information from the building monitoring system comprises an alarm status and the information from the building management system comprises building status information, and a decision engine configured to receive information from the middleware system and to determine a mitigation action in response to receiving a positive alarm status.

In addition to one or more of the features described above, or as an alternative, further embodiments of the building response systems may include a user interface system configured to transmit a notification to a user in response to the positive alarm status.

In addition to one or more of the features described above, or as an alternative, further embodiments of the building response systems may include that the notification comprises as least one of an email, a text message, a digital message, an application notification, and a visual screen alert on a personal computer.

In addition to one or more of the features described above, or as an alternative, further embodiments of the building response systems may include that the building monitoring system is at least one of a LIDAR sensor and a duct sensor.

In addition to one or more of the features described above, or as an alternative, further embodiments of the building response systems may include that the mitigation action comprises adjusting an HVAC operation associated with a region having the positive alarm status.

In addition to one or more of the features described above, or as an alternative, further embodiments of the building response systems may include that the building monitoring system is configured to transmit the alarm status to the building management system.

In addition to one or more of the features described above, or as an alternative, further embodiments of the building response systems may include that the middleware system is configured to convert mitigation commands received from the decision engine into hardware instructions and transmit such hardware instructions to the building management system.

In addition to one or more of the features described above, or as an alternative, further embodiments of the building response systems may include that the middleware system and the decision engine are contained on a single computer system.

In addition to one or more of the features described above, or as an alternative, further embodiments of the building response systems may include that the computer system further includes the building management system.

In addition to one or more of the features described above, or as an alternative, further embodiments of the building response systems may include a heating ventilation and air conditioning ("HVAC") system associated with the enclosed space, wherein the mitigation action of the decision engine is selected to control an operation of the HVAC system.

According to some embodiments, methods of automatically responding to a detection of a harmful agent within an enclosed space are provided. The methods include detecting a presence of the harmful agent within an enclosed space with a building monitoring system, monitoring a building status with a building management system, transmitting an alarm status from the building monitoring system to a middleware system, transmitting a building status from the building management system to the middleware system, transmitting the building status and the alarm status from the middleware to a decision engine, determining, at the decision engine, a mitigation action, and performing the mitigation action.

In addition to one or more of the features described above, or as an alternative, further embodiments of the methods may include transmitting a notification to a user.

In addition to one or more of the features described above, or as an alternative, further embodiments of the methods may include that the notification comprises as least one of an email, a text message, a digital message, an application notification, and a visual screen alert on a personal computer.

In addition to one or more of the features described above, or as an alternative, further embodiments of the methods may include that the building monitoring system is at least one of a LIDAR sensor and a duct sensor.

In addition to one or more of the features described above, or as an alternative, further embodiments of the methods may include that the mitigation action comprises adjusting an HVAC operation associated with a region having the positive alarm status.

In addition to one or more of the features described above, or as an alternative, further embodiments of the methods may include transmitting the alarm status from the building monitoring system to the building management system.

The method of claim 11, further comprising converting mitigation commands received at the middleware system from the decision engine into hardware instructions and transmitting such hardware instructions to the building management system.

In addition to one or more of the features described above, or as an alternative, further embodiments of the methods may include that the conversion comprises converting a digital mitigation command into an analog hardware action.

In addition to one or more of the features described above, or as an alternative, further embodiments of the methods may include that the middleware system and the decision engine are contained on separate computer systems.

In addition to one or more of the features described above, or as an alternative, further embodiments of the methods may include controlling a heating ventilation and air conditioning ("HVAC") system associated with the enclosed space, wherein the mitigation action of the decision engine is selected to control an operation of the HVAC system.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

FIG. 4 is a process diagram of operation of a building response system in accordance with an embodiment of the present disclosure.

DETAILED DESCRIPTION

A detailed description of one or more embodiments of the disclosed apparatus and method are presented herein by way of exemplification and not limitation with reference to the Figures.

Nearly all critical infrastructure (e.g., public transportation, airports, public buildings, etc.) lack automated systems for the detection, notification, and response to a release of hazardous biological agents. It is generally assumed that the cost and operational requirements of such a system are excessive, despite the serious consequences of a release. In view of this, embodiments of the present disclosure challenge these assumptions and are directed to providing an automated system that can detect and respond to biological agent releases within a confined space, such as a building, room, warehouse, etc. In accordance with some embodiments, building systems and sensors (e.g., heating ventilation and air conditioning ("HVAC") systems, fire and security systems, etc.), along with smoke detection systems and biological agent detection systems are integrated to deliver a cost effective sense and response system deployable in a broad range of critical infrastructure, commercial buildings, and public buildings and settings, etc.

As described herein, building response systems are described related to automation of a building response to a detected biological agent or other harmful agents (e.g., biological, biochemical, chemical, etc.). The automated responses may involve changing the settings of HVAC equipment in a building, as well as other response actions, such as automatic locking or unlocking of doors and shutdown of building systems and access. The systems incorporate and employ various types of sensors and detectors distributed through a building to detect a harmful agent. Upon detection of the harmful agent, the building response systems of the present disclosure make decisions on appropriate responses and automate the implementations of such decisions as necessary.

The response actions may be referred to as mitigation response actions. For example, by controlling airflow through a building, a harmful agent may be contained within only a specific location where it is first detected, thus limiting a spread of such agent and reducing human exposure to such agent. For example, air vents to specific locations can be closed or opened, purge processes (e.g., significantly increased an outflow volume of air from a specific location), lock down, etc. may be employed in accordance with embodiments of the present disclosure.

Figure 1:
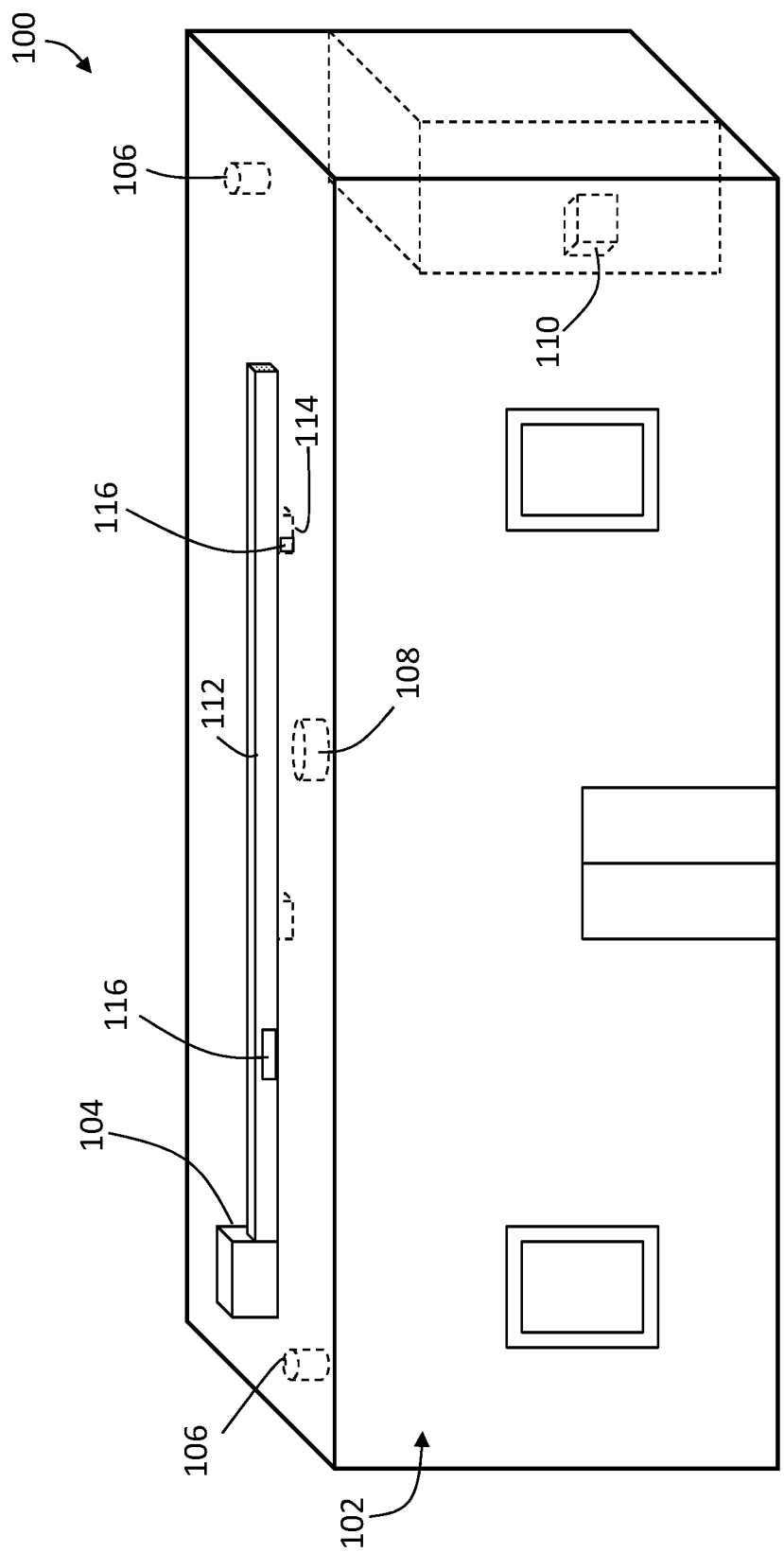
FIG. 1 is a schematic illustration of a building that may incorporate embodiments of the present disclosure.

Turning to FIG. 1, a schematic illustration of a building 100 that may incorporate embodiments of the present disclosure is shown. The building 100 may be any type of building (e.g., private, commercial, public, etc.). The building 100 defines an interior or enclosed space 102. The building 100 includes various building systems, including, for example, an HVAC system 104, a smoke detection system 106, a LIDAR system 108, and a building management system 110.

The HVAC system 104 can include various components, as will be appreciated by those of skill in the art, including, but not limited to ducting 112 and vents 114. The HVAC system 104 is configured to cycle air into and out of the enclosed space 102 and may provide climate control functionality. The ducting 112 and/or vents 114 can include sensors 116 that are configured to monitor air quality (e.g., particulates, temperatures, gases, compounds, etc.). The smoke detection system 106 may include one or more types of smoke detectors and sensors, and may be configured in conjunction with a sprinkler or other fire suppression system, as will be appreciated by those of skill in the art. The LIDAR system 108 can include one or more types of light detection and ranging sensors and systems, which can be configured to detect particulates in the air of the enclosed space 102. Other systems of the building 100 can include, without limitation, alarm systems, monitoring systems, elevator systems, video systems, closed circuit video systems, water supply systems, gas supply systems, electric and electrical systems, etc. All of these systems may be referred to collectively as building systems and can include sensors associated therewith. For example, the building systems include sensors to form building monitoring systems that can detect and/or collect data associated with the type of system involved. These systems are well understood and implemented throughout buildings and infrastructure, as appreciated by those of skill in the art.

The building management system 110 may be operably connected to and/or in communication with the HVAC system 104, the smoke detector system 106, and the LIDAR system 108. As noted above, these and other known detection systems are referred to herein as "building monitoring systems". The building management system 110 may include a computer and/or server that is located onsite or offsite from the building 100. As shown, the building management system 110 is located onsite of the building 100. The building management system 110 is configured to receive data and/or input from the various building monitoring systems and may be configured to process such data/input to make decisions with respect to building response and functional actions. The building management system 110 is configured to perform the processes described herein, and as described below, to cause a building response in the event of a detection of a biological agent release within the enclosed space 102.

For example, the building management system 110 may be configured to activate alarms, close doors/windows, deactivate elevators, generate audio announcements, control airflow and other aspects of the HVAC system 104, etc. For example, the building management system 110 may include electrical connection to various devices and components of the building systems to enable control thereof. Such control may be through controlling electrical current or voltage to one or more components to cause a particular action. In some situations, such control can include fan speeds and duct/vent positions and states by either supply power to or cutting power off from certain components, or changing a voltage supply thereto. In configurations of door or window control, for example, electrical supply to a magnet or actuator of the door or window may be controlled to achieved a desired action (e.g., open or close, lock or unlock).

The determination of a biological agent release may be detected by one or more of the building monitoring systems (e.g., systems 104, 106, 108). Such determination or detection may be conveyed to the building management system 110 to cause a response, such as a mitigation action to reduce or prevent spread of a harmful agent. That is, the building monitoring systems are configured to transmit a detection to a central decision location to enable an automated response.

Figure 2:
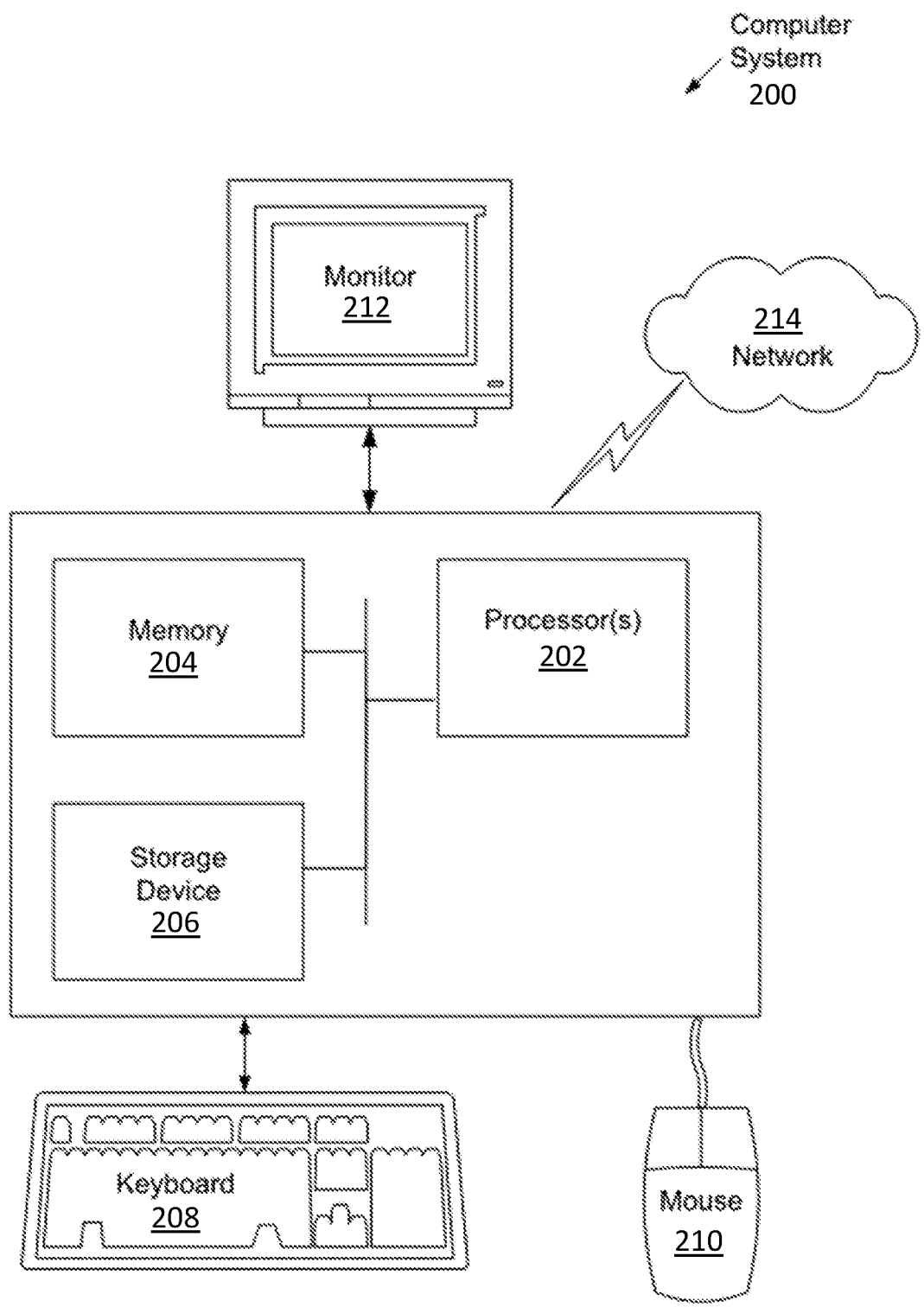
FIG. 2 is a schematic diagram of a system that may implement embodiments of the present disclosure.

Turning now to FIG. 2, a schematic diagram of a computer system 200 in the form of a networked computer system is shown. The computer system 200 may be used, for example, to implement one or more aspects of the present disclosure, such as the building management system described above, or a building management system, a middleware system, a decision engine, and/or a user interface system, as described below. In the example of FIG. 2, the computer system 200 includes a processor 202, associated memory 204, a storage device 206, and numerous other elements and functionalities typical of today's computers (not shown). The computer system 200 may also include input means, such as a keyboard 208 and a mouse 210, and output means, such as a monitor or display 212. The computer system 200 may be connected to a network 214, such as a local area network (LAN) or a wide area network (e.g., the Internet) via a network interface connection (not shown). Those skilled in the art will appreciate that these input and output means may take many other forms. Additionally, in some configurations the computer system may not be connected to a network. Further, those skilled in the art will appreciate that one or more elements of aforementioned computer system 200 may be located at a remote location and connected to the other elements over the network 214. As such, a computer system, such as the computer system 200, and/or any other computer system known in the art may be used in accordance with embodiments disclosed herein.

The computer system 200 may also include various wired or wireless input/output interfaces, such as printed circuit boards and data buses, that enable data communication between the computer systems 200 and one or more building monitoring systems and/or other building systems, such as described with respect to FIG. 1. Such communication may be over a network, or may be a direct wired or wireless connection between the computer system 200 and the associated building systems.

Figure 3:
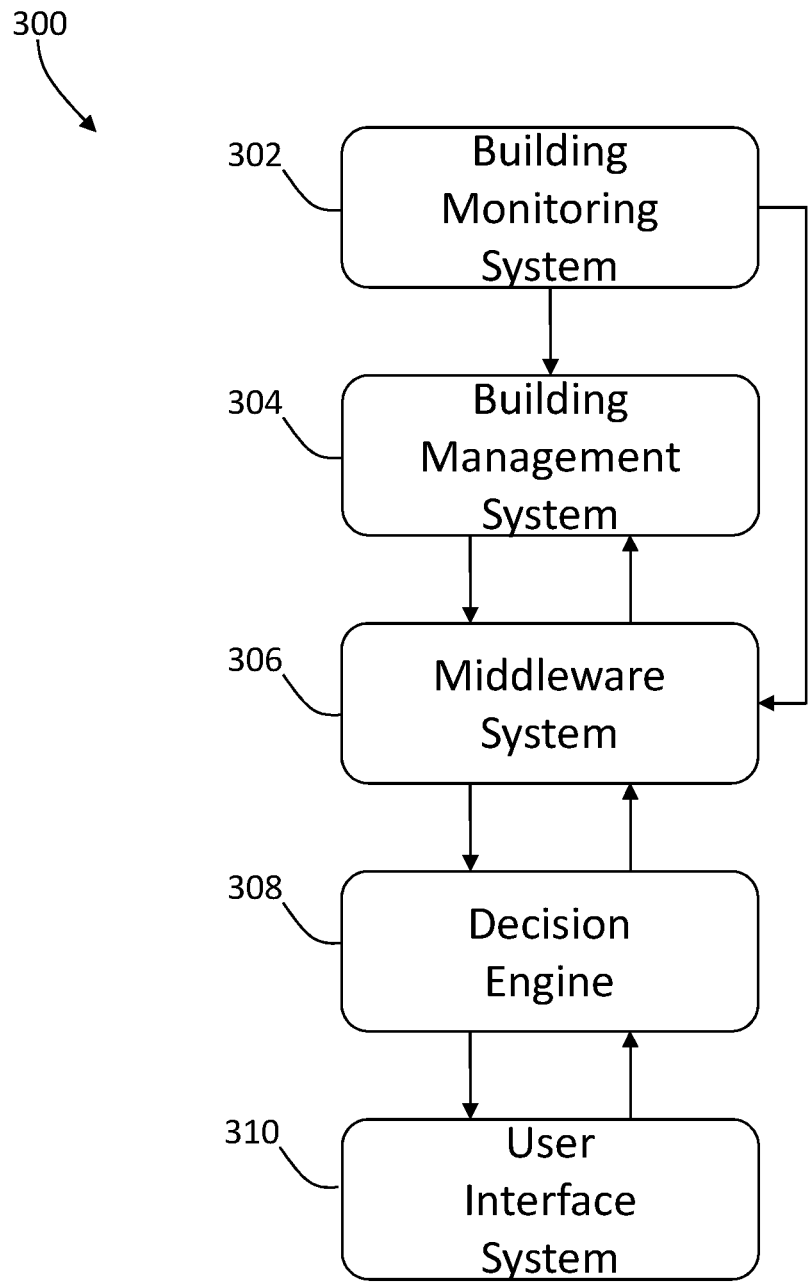
FIG. 3 is a schematic diagram of a building response system in accordance with an embodiment of the present disclosure.

Turning now to FIG. 3, a schematic diagram of a building response system 300 in accordance with an embodiment of the present disclosure is shown. The building response system 300 may be implemented on one or more computer systems, such as shown in FIG. 2, and may be implemented as part of a computer system that includes a building management system. The building response system 300 includes a building monitoring system 302, a building management system 304, a middleware system 306, a decision engine 308, and a user interface system 310. The building monitoring system 302 may be implemented on and include one or more building systems and associated sensors that are distributed about an enclosed space. The building management system 304, the middleware system 306, the decision engine 308, and the user interface system 310 may be implemented as software or hardware solutions. In some embodiments, each of the building management system 304, the middleware system 306, the decision engine 308, and the user interface system 310 may be implemented as programs stored and operated on a computer system, such as shown and described with respect to FIG. 2. In other embodiments, one or more of the building management system 304, the middleware system 306, the decision engine 308, and the user interface system 310 may be implemented on one or more separate computer systems (or may be completely or partially cloud-based).

As shown, a building monitoring system 302 can transmit data or information to a building management system 304 and to a middleware system 306. Such data or information may include operational states of associated components and/or alarm states (e.g., YES alarm based on sensor detection). The building monitoring system 302 may include sensors to detect when a level of a given material, gas, or particulate exceeds a baseline by a specified amount (e.g., percentage amount, particle count amount, etc.) over a certain amount of time. When such detection is made, the building monitoring system 302 is configured to send a YES alarm signal to the middleware system 306 and/or the building management system 304.

The building monitoring system 302 may be configured to detect the presence of biological agents present within a monitored building (e.g., duct sensors, LIDAR sensors, etc.). That is, the building monitoring system 302 may include one or more sensors arranged throughout a building that are configured to detect the presence of harmful agents. Such building monitoring system 302 can be configured to measure particle counts based on fluorescence and compare to a baseline count for the particular building (e.g., a baseline that is indicative of no biological agent present). In such systems, a detection alarm may be triggered when the particle count exceeds an adjustable threshold based on ambient conditions. In a non-limiting example, the building monitoring system 302 may be configured to run an algorithm that compares a current detected number of particles to historical data or a preset value. In some such examples, the preset value may be set when the sensor is installed, and based on environmental and ambient conditions representative of the presence of no (or acceptable) levels of detectable particles. When the detected threshold exceeds the baseline by a specified amount (e.g., percentage amount, particle count amount, etc.) over a certain amount of time, the building monitoring system 302 is configured to send a YES alarm signal to the middleware system 306.

The building monitoring system 302 may be directly connected to the building management system 304 or may be connected to the building management system 304 through the middleware system 306. The middleware system 304 is configured to read detection or alarm data from the building monitoring system 302 and the operating status of various building systems and components, such as air handling units or other parts of an HVAC system. The information regarding the building systems may be obtained from the building management system 304. The operating status can include, for example, airflow rates, static pressure in ducts, various damper positions, and fan speeds. The middleware system 306, in some embodiments, may be configured to continuously collect data at different rates from the building systems and from the building monitoring system 302. The middleware system 304 is configured to send a detection alarm to the decision engine 308 (e.g., YES alarm from the building monitoring system 302).

The middleware system 306 is configured to report to the decision engine 308. When a threat is detected, such as a biological agent release (e.g., YES alarm), the decision engine 308, upon receiving notification from the middleware system 306, is configured to decide upon one or more appropriate mitigation actions based on where a harmful agent is detected and current operating status(es) of the building systems (e.g., air handling units, doors, windows, etc.). For example, in one non-limiting embodiment, the decision engine 308 is configured to employ a look-up table in order to decide a proper response action. The look-up table can include various information related to specific actions based on the specific alarm activation. For example, depending on the type and location of the sensor that generates the YES alarm, the look-up table may be used to cause different responses. In some such examples, the decision engine 308 may be configured to send specific mitigation commands (e.g., set-point information) to the middleware system 306. The set mitigation commands, obtained from a look-up table, can include, without limitation, state of exhaust air damper, state of supply air damper, state of return air damper, supply fan speed, and return fan speed. For example, in one mitigation command instruction, the decision engine 308 may be transmit a set-point of an exhaust air damper to 100% (e.g., close exhaust damper and prevent any biological agent from leaving the enclosed space). The middleware system 306 will receive such mitigation command and send a hardware action instruction to the building management system 304 to thereby control a building system, device, or component.

The look-up table employed by the decision engine 308 may be pre-determined or pre-set during a commissioning stage to ensure the operation safety of associated building systems and devices. The look-up table, as noted above, may be based, at least in part, upon the types of sensors used within a system/building, the specific building configuration, the types of detectable agents, the HVAC and other integrated systems of the building, the environment in which the building is located, ambient conditions at the building, etc. The look-up table can include a variety of actions that may be performed by various different systems, devices, and components of the building systems, which can impact a spread of a harmful agent.

Although described as a look-up table, response actions generated by the decision engine in accordance with the present disclosure, may be based on other types of decision making. For example, machine learning of responses, both of the present system and from other similar systems, may be used for decision making. Such machine learning operation may be updated in real time, periodically on a schedules, or by user instruction. The machine learning may be self-contained, in that once the system is installed and set with initial settings/parameters, the machine learning may adjust the parameters based on detected changes, such as changes in the environment, changes in air flow systems, etc. Such updates may also be employed with a look-up table configuration, as will be appreciated by those of skill in the art.

The mitigation commands of the decision engine 308 are transmitted to the middleware system 306, which translates the high level commands into specific hardware actions to control devices or systems of the building (e.g., damper positions and fan speeds). These hardware actions are transmitted to the building management system 304 for implementation. The building management system 304 may assign transmit instructions over a communication protocol to a piece of hardware or may directly control a power supply to a piece of hardware.

For example, a purge command from the decision engine 308 may consist of actions such as fully open outside air damper, exhaust air damper, fully close return air damper, and ramp up speed for supply air fan and return air fan. After receiving these instructions, the middleware system 306 is configured to employ a look-up table or other data set to determine the appropriate hardware addresses for these devices and sends digital signals to the building management system 304. Other example mitigation actions can include, without limitation, purges, shut downs, or pressurizing of air handling units, depending on the location of the detected threat. In a two-floor office building, for example, the decision engine 308 may choose to purge the second floor and shut down the first floor when a threat is detected from a sensor located on the second floor and no threat is detected from a sensor located on the first floor.

In operation, in one non-limiting example, the decision engine 308 will transmit mitigation commands to the middleware system 306 regarding a determined mitigation action. The middleware system 306 will process the mitigation command information into hardware commands, such as a change in set-points or operational parameters of specific components of the building and assign such changed parameters to appropriate hardware addresses in the building management system 304. The building management system 304 will then transmit such hardware commands to appropriate devices, for example, as an appropriate voltage or current relay depending on the actual end device to be controlled/adjusted. The building management system 304 is thus able to control one or more aspects of a building to achieve a desired mitigation response action. That is, the middleware system 306 issues hardware actions to achieve a desired mitigation response or action. The hardware actions are implemented by the building management system 304. For example, the building management system 304 may be configured to set building devices to specific preset or required conditions (e.g., fan speeds, vent open state, door open state, door lock state, window open state, etc.) in response to instructions received from the middleware system 306. In the building response system 300, the building management system 304 is configured to control one or more aspects or features of a building that is being monitored. Such aspects can include, without limitation, fire door status (e.g., open/closed), alarm status (e.g., active/inactive), HVAC control (e.g., vents open/vents closed), door lock control (e.g., locked/unlocked), etc. Each of these features and actions may be controlled to electronic commands to onboard processors of the building systems and/or through power control (e.g., current and/or voltage control).

In some configurations, the middleware system 306 may be configured to periodically check the status of the controlled devices and report back to the decision engine 308.

Such checks may be made to ensure that the desired action was performed by the specific device or component. In some such configurations, if a specific device takes too long to respond or fails to meet a target value, the decision engine 308 may be configured to abort the selected action for the device and display the result in the user interface, as described below.

In one example of operation, building response system 300 employs the building monitoring system 302 to process physical measurements (e.g., particle counts) and adjust a detection threshold based on ambient conditions. From this, an alarm signal may be generated if the detection threshold is exceeded. The alarm signal, in some embodiments, is in the form of Yes/No (0 or 1) digital format. This digital alarm signal may be passed through the middleware system 306 and conveyed to the decision engine 308 to implement a response to a YES alarm.

In some configurations, the building monitoring system 302 may be directly connected to the building management system 304, if the building management system 304 can be reconfigured. In other configurations, the building monitoring system 302 may be connected to the building management system 304 through the middleware system 306. Still further, in some embodiments, the building monitoring system 302 may be connected directly to the building management system 304 and through the middleware system 306.

It will be appreciated that the building management system 304, the middleware system 306, and the decision engine 308 may all be implemented within a single computer or computing device (e.g., as shown in FIG. 2). In other embodiments, the building management system 304, the middleware system 306, and the decision engine 308 may be implemented on one or more separate/distinct physical devices or parts of a system.

In some embodiments, the middleware system 306 is connected to the building management system 304 via digital networking (e.g., Ethernet, wireless connection, etc.) and is configured to receive digital signals from the building management system 304. The building monitoring system 302 can be connected to the middleware system 306 directly. This configuration may be useful when the building management system 304 does not allow new sensor connections (e.g., the building response system 300 is implemented within an existing building system). In some embodiments, the middleware system 306 and the decision engine 308, as noted, may reside in a single piece of hardware (e.g., a single computer system). Such configuration may be implemented when the building management system 304 resides in another piece of hardware (e.g., a dedicated server or computer). However, as noted, it is possible to combine the middleware system 306, the decision engine 308, and the building management system 304 on a single piece of hardware for the entire building response system 300. It will be appreciated that by implementing the different systems on separate structures can allow for wider application to existing buildings and retrofit.

In addition to making decisions regarding mitigation actions, the decision engine 308 may be configured to cause notification to a user or other appropriate person or system regarding the detection of a biological agent release through the user interface system 310. The user interface system 310 may comprise various mechanisms, devices, and/or communication protocols. For example, the user interface system 310 can include notifications on a display (e.g., computer monitor). Further, in some embodiments, the user interface system 310 may include transmission of a notification in the form of an email, text message, digital message, application notification, etc., that can be transmitted from the building management system 304 (or other associated electronic system) to a user device, such as a personal computer, mobile phone, tablet, mobile device, pager, etc., as will be appreciated by those of skill in the art. In some configurations, the user interface system 310 may be configured to display information regarding a response or mitigation action. For example, in some such embodiments, the user interface system 310 may include a display screen for displaying status information including, but not limited to, devices or building systems that do not respond as intended. Such information can inform a user to take additional measure or action, such as instruct an evacuation, manually override the automated system, notify appropriate authorities, etc.

Turning now to FIG. 4, a process diagram 400 of operation of a building response system in accordance with an embodiment of the present disclosure is shown. Along the horizontal top of the process diagram 400 are the various components of a building response system 402 in accordance with an embodiment of the present disclosure. The building response system 402, similar to that described above, includes a building monitoring system 404, a building management system 406, a middleware system 408, a decision engine 410, and a user interface system 412. Vertically, in FIG. 4, is a time axis is indicated.

The building monitoring system 404 is configured to generate YES/NO data output that can be transmitted to the building management system 406 and/or the middleware system 408. Simultaneously, the building management system 406 may transmit building status information to the middleware system 408. The transmission of the data from the building monitoring system 404 and/or the building status data from the building management system 406 may be sent on a schedule, periodically, only when a "YES" alarm is detected, continuously, or based on some other parameter. In some embodiments, when the building management system 406 receives a "YES" alarm indicator from the building monitoring system 404, such receipt may prompt or cause the building management system 406 to transmit building status information or data to the middleware system 408.

The middleware system 408 will then aggregate the data received from the building monitoring system 404 and the building management system 406 and transmit such data to the decision engine 410 (e.g., convert digital and analog data into a digital format for processing by the decision engine 410). The middleware system 408 is configured to operate as an aggregator, translator, or other intermediate processor system that can receive data and information and convert such data and information into different formats to be processed by other components. In one direction (e.g., to the right in FIG. 4), the middleware system 408 is configured to collect data and information from different types of sensors (e.g., the building monitoring system 404) which may be received in analog and/or digital signals and also receive bit data from the building management system 406. The middleware system 408 will then process such data into a format to be interpreted by the decision engine 410, such as in a digital format.

The decision engine 410 is configured to receive the building status information and the alarm information (e.g., YES/NO) from the middleware system 408. Based on this information, the decision engine 410 will determine what mitigation action should be taken. The decision process can include the use of a look-up table, as discussed above.

For example, if the sensor YES/NO data indicates an alarm YES, the decision engine 410 can incorporate the building status information to determine an appropriate automatic response to such positive alarm activation. Such automated responses may include keeping a steady state of a current air controlling system (e.g., maintain current closed state or maintain current airflow state). Alternatively, some such responses may include an actuation or action by a specific components, such as closing or sealing off a portion of a building associated with the positive alarm, thereby preventing the spread of any harmful agent that is detected. In other cases, the mitigation action may include HVAC actions/operations, such as purging or flushing the air from a given part of a building. In such instances, the vents and fans associated with a region having a positive alarm may be opened and activated into full speed or maximum airflow (outward) to extract and expel the air (and any suspended harmful agents) from the enclosed space having such positive alarm. Other mitigation actions may include activating fire doors to seal a portion of the enclosed space, activating audible and visual alarms to notify occupants to evacuate.

When the decision engine 410 determines specific mitigation actions to be taken from a look-up table or other decision process/algorithm, the decision engine 410 will transmit instructions in the form of mitigation commands back to the middleware system 408. The middleware system 408 will convert such mitigation commands from the decision engine 410 into appropriate hardware actions. Such conversion can include a conversion from a digital mitigation command into an analog hardware action. The hardware actions may be signals or data commands to be sent to hardware of the building and/or the building management system 406 to perform operations in line with the instructions and commands from the decision engine 410. In some embodiments, the building management system 406 will receive the hardware actions from the middleware system 408 and take appropriate actions, such as transmitting a digital command and/or controlling a power supply to a building component.

The decision engine 410 can also, optionally, cause notification to a user or other personnel associated with the building. In such instances, the decision engine 410 may transmit a command to a user interface system 412. The user interface system 412 may then provide a notification to a user or other authorized or registered person or system. Such notifications may include, without limitation, emails, text messages, digital messages, application notifications, visual screen alerts on a personal computer, etc.

Advantageously, embodiments of the present disclosure provide for an automated mechanism for responding to detection of a harmful agent, such as a biological agent, within an enclosed space. The systems of the present disclosure may be implemented within many different building and enclosed space configurations, and allows for retrofit and implementation within existing building systems. The separation of the decision engine, with the intermediate middleware, enables broad applicability and enabling rapid and automated response to harmful agent detection within an enclosed space.

As used herein, the terms "about" and "substantially" are intended to include the degree of error associated with measurement of the particular quantity based upon the equipment available at the time of filing the application. For example, the terms may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A building response system comprising:
a building monitoring system configured to detect a presence of a harmful agent within an enclosed space of a building, the building monitoring system comprising at least one LIDAR sensor arranged to monitor the enclosed space and at least one duct sensor arranged in a ducting fluidly connected to the enclosed space, wherein the building monitoring system is configured to generate an alarm status based on information received from each of the at least one LIDAR sensor and the at least one duct sensor associated with detection of the harmful agent;
a building management system configured to monitor a building status and control building systems of the building to generate building status information;
a middleware system configured to receive information from each of the building monitoring system and the building management system, wherein the information from the building monitoring system comprises the alarm status and the information from the building management system comprises the building status information; and
a decision engine configured to receive information from the middleware system and to determine a mitigation action in response to receiving a positive alarm status, the decision engine configured to transmit one or more mitigation commands associated with the mitigation action to the middleware system,
wherein the middleware system is configured to convert mitigation commands received from the decision engine into hardware instructions and transmit such hardware instructions to the building management system to perform the mitigation action, wherein the mitigation action comprises controlling a ventilation system to adjust airflow to contain a detected harmful agent.

2. The building response system of claim 1, further comprising a user interface system configured to transmit a notification to a user in response to the positive alarm status.

3. The building response system of claim 2, wherein the notification comprises as least one of an email, a text message, a digital message, an application notification, and a visual screen alert on a personal computer.

4. The building response system of claim 1, further comprising a heating ventilation and air conditioning ("HVAC") system associated with the enclosed space that includes the ventilation system, wherein the mitigation action comprises adjusting an operation of the HVAC system associated with a region of the building having the positive alarm status.

5. The building response system of claim 1, wherein the building monitoring system is configured to transmit the alarm status to the building management system.

6. The building response system of claim 1, wherein the middleware system and the decision engine are contained on a single computer system.

7. The building response system of claim 6, wherein the computer system further includes the building management system.

8. The building response system of claim 1, further comprising a heating ventilation and air conditioning ("HVAC") system associated with the enclosed space that includes the ventilation system, wherein the mitigation action of the decision engine is selected to control an operation of the HVAC system.

9. A method of automatically responding to a detection of a harmful agent within an enclosed space, the method comprising:
  detecting a presence of the harmful agent within an enclosed space of a building with a building monitoring system, the building monitoring system comprising at least one LIDAR sensor arranged to monitor the enclosed space and at least one duct sensor arranged in a ducting fluidly connected to the enclosed space, wherein the building monitoring system is configured to generate an alarm status based on information received from each of the at least one LIDAR sensor and the at least one duct sensor associated with detection of the harmful agent;
  monitoring a building status with a building management system of the building to generate building status information;
  transmitting the alarm status from the building monitoring system to a middleware system;
  transmitting the building status information from the building management system to the middleware system;
  transmitting the building status information and the alarm status from the middleware system to a decision engine;
  determining, at the decision engine, a mitigation action in response to a positive alarm status, the mitigation action comprising one or more mitigation commands;
  transmitting the mitigation commands to the middleware system;
  converting, with the middleware system, the mitigation commands into hardware instructions;
  transmitting the hardware instructions to the building management system; and
  performing the mitigation action based on the hardware instructions, wherein the mitigation action comprises controlling a ventilation system to adjust airflow to contain a detected harmful agent.

10. The method of claim 9, further comprising transmitting a notification to a user.

11. The method of claim 10, wherein the notification comprises as least one of an email, a text message, a digital message, an application notification, and a visual screen alert on a personal computer.

12. The method of claim 9, wherein the mitigation action comprises adjusting an HVAC operation associated with a region of the building having the positive alarm status wherein the HVAC operation includes control of the ventilation system.

13. The method of claim 9, further comprising transmitting the alarm status from the building monitoring system to the building management system.

14. The method of claim 9, wherein the conversion comprises converting a digital mitigation command into an analog hardware action.

15. The method of claim 9, wherein the middleware system and the decision engine are contained on separate computer systems.

16. The method of claim 9, further comprising controlling a heating ventilation and air conditioning ("HVAC") system associated with the enclosed space that includes the ventilation system, wherein the mitigation action of the decision engine is selected to control an operation of the HVAC system.

* * * * *